United States Patent [19]
Bassett

[11] 3,972,019
[45] July 27, 1976

[54] TIME SYNCHRONIZATION

[75] Inventor: Edward James Bassett, Orpington, England

[73] Assignee: Seismograph Service Corporation, Tulsa, Okla.

[22] Filed: July 9, 1973

[21] Appl. No.: 377,718

[52] U.S. Cl. .................... 340/15.5 TS; 340/15.5 TG
[51] Int. Cl.² .......................................... G01V 1/22
[58] Field of Search .............. 340/15.5 TG, 15.5 TS

[56] References Cited
UNITED STATES PATENTS

| | | | |
|---|---|---|---|
| 3,288,242 | 11/1966 | Loeb ............................ | 340/15.5 TS |
| 3,416,631 | 12/1968 | Patterson .................... | 340/15.5 TG |
| 3,733,584 | 5/1973 | Pelton et al. ................ | 340/15.5 TG |
| 3,739,870 | 6/1973 | Pelton et al. ................ | 340/15.5 R |

Primary Examiner—Howard A. Birmiel
Attorney, Agent, or Firm—Mason, Kolehmainen, Rathburn & Wyss

[57] ABSTRACT

Accurate timing at distant points is obtained by timing units which will operate independently at these points without the transmission of time signals between the units. Each unit includes means for producing time pulses at time intervals which are the same in the different units and means are provided for synchronizing the units when one is brought to and connected directly with the other.

2 Claims, 7 Drawing Figures

Fig. 4
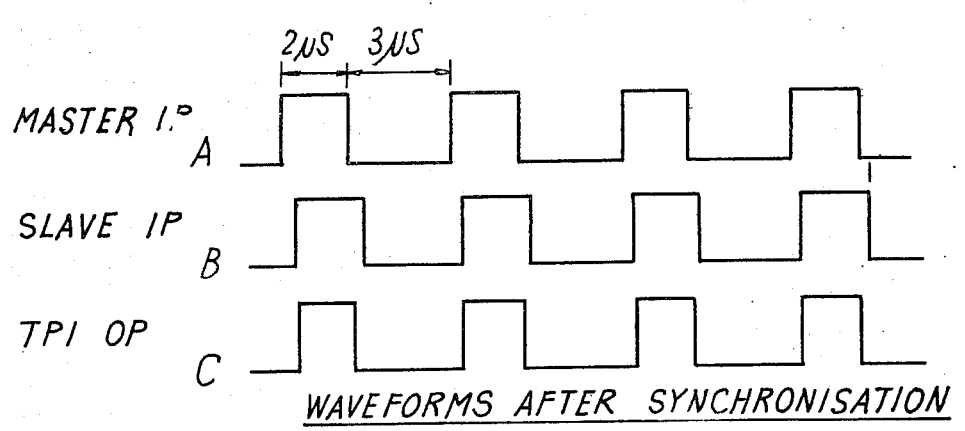
WAVEFORMS AFTER SYNCHRONISATION
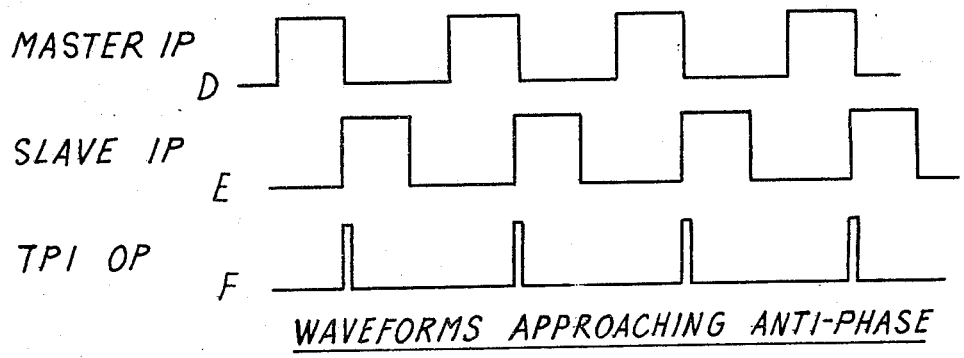
WAVEFORMS APPROACHING ANTI-PHASE

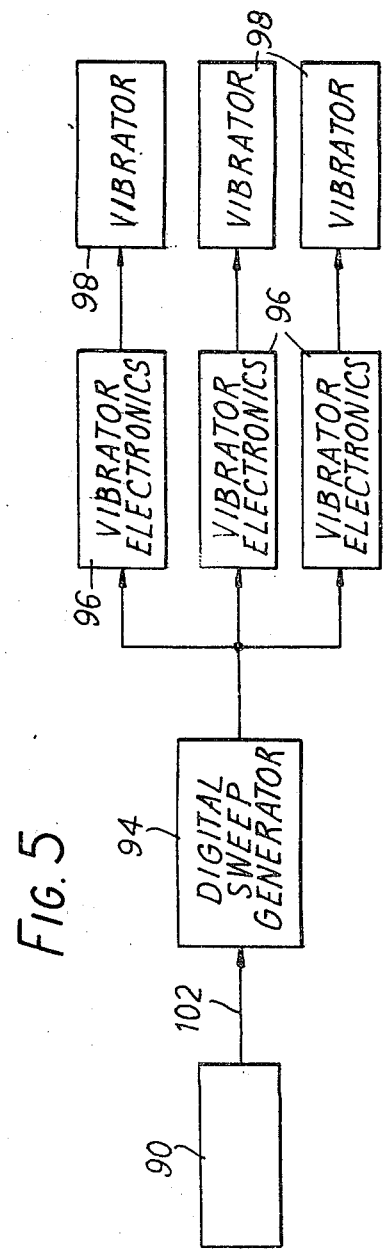
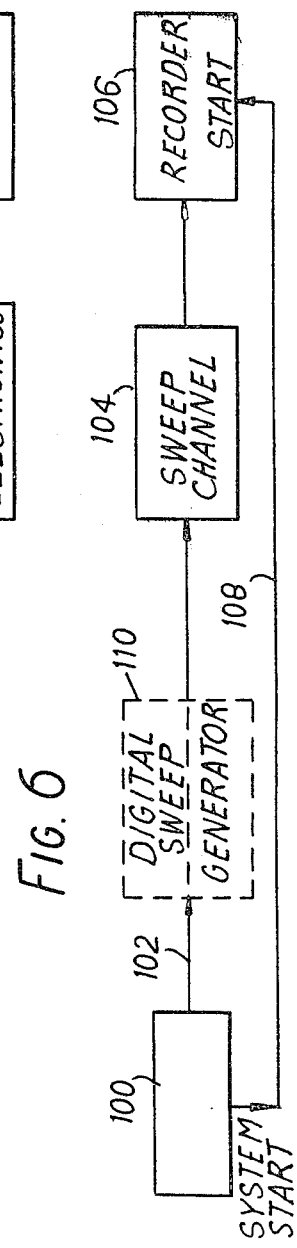

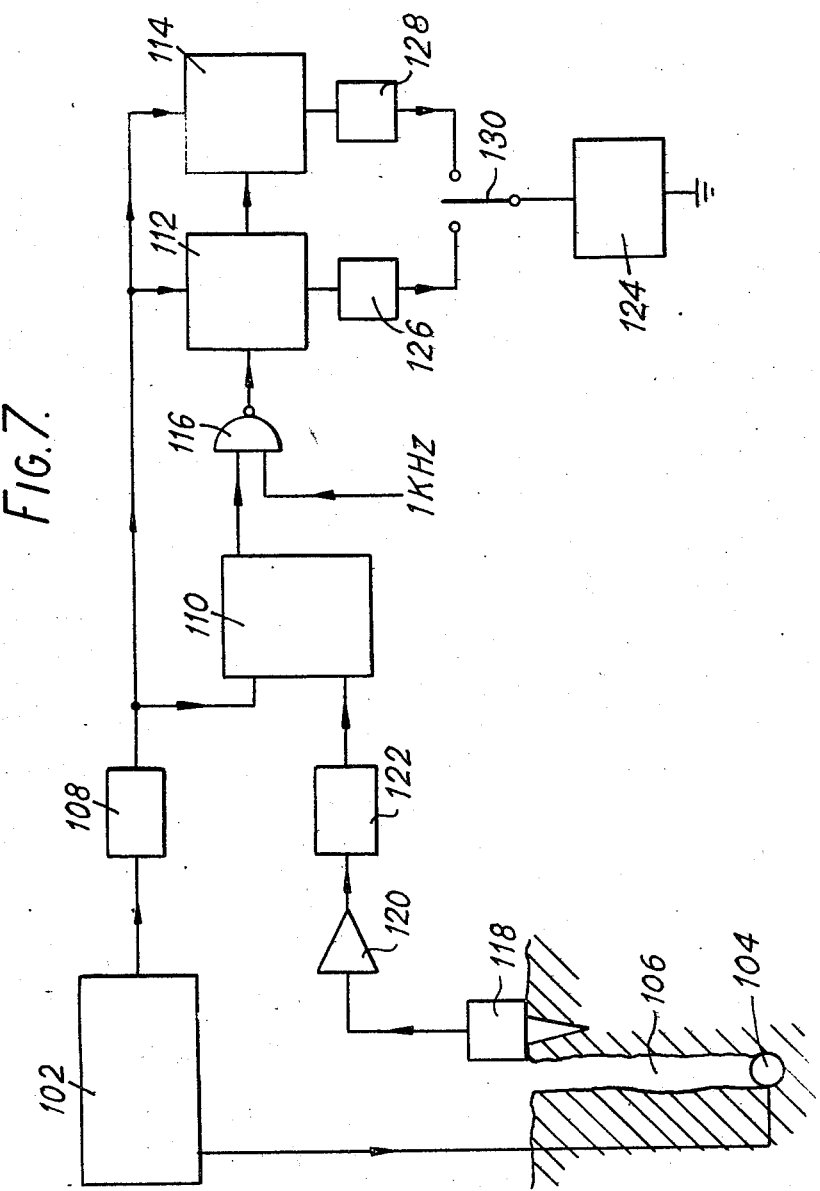

TIME SYNCHRONIZATION

This invention relates to methods of and apparatus for obtaining good time synchronisation between operations which are carried out at separate points or by different pieces of apparatus. It is also concerned with the construction of timing units and their adjustment and synchronisation.

The invention has been devised primarily for use in connection with seismic surveying and it will be described with particular reference to this, although it is capable of other applications and uses.

In present day seismic exploration it is often necessary on either geophysical or economic grounds to trigger the seismic source at a location remote from the recording instruments. For the recorded seismic data to be given a time scale for subsequent processing purposes the trigger instant must be placed on record accurately, the standard aimed at being ± 1mS.

A number of methods of transmitting this datum over ranges of up to about 3 miles have been continuously improved over the past few years, but these always involve the use of circuitry of ever increasing complexity to cope with the standard and reliability demanded. However, with the necessity now for more distant separation of the source location from the recording position, often in difficult terrain, which may be covered in saturated rain forest, and sometimes under conditions of heavy static, the data transmission quality necessary to meet the required timing standard is becoming increasingly difficult to achieve.

The remote control firing systems which have been used have all depended upon the establishment of the same time scale at the control and source locations. A line or radio link is used for this purpose and synchronism of the timing units or clocks, one of which is provided at each of the control and source locations, is established just prior to triggering the source. Thus a fresh synchronisation has to be performed for each record.

With the clocks synchronised in this way a time interval of, typically, from one half to two or three seconds elapses before the source is triggered. Clocks of very loose tolerance are adequate to maintain synchronisation over this short period, unovened crystal oscillators are often used with frequency stabilities of about 100 parts per million. The major source of error in this method is not due to any inaccuracy in the clock, but a result of the inevitable delay in the remote synchronisation process. The economics of the field instrumentation make it desirable to use inexpensive run-of-the-mill commercial radios. These necessarily catered for voice communication only and consequently had a pass band of, typically, 300 – 3000 Hz and sometimes less. The method of synchronisation must use these frequencies and indeed, for optimum signal to noise ratio, the centre part of this band only. Coded radio systems in general met with the greatest success, a unique synchronising code being carried on two or more frequencies, but, nevertheless, a time lag in the process invariably occurred due to the constraints on the choice of frequencies which could be used. In practice this led to over-all delays which were rarely inside the ± 1mS standard. This was an inherent delay even in ideal radio conditions; in noisy conditions the problems became really serious.

It is one of the objects of the present invention to provide methods of and means for obtaining accurate synchronisation between shot points and a recording station using timing units which will provide accurate synchronisation over considerable periods without requiring frequent connection and synchronisation with each other, whether by radio or other means.

Another object of the invention is to provide timing units which can be used for other purposes, as well as seismic surveying, the timing of which units can be measured and adjusted with ease and accuracy.

The invention will first be described as applied to seismic prospecting where the seismic energy source (or each of a number of sources) has to be used at a location remote from the receiving station or recorder. The apparatus which will be described is designed to replace existing types of apparatus which rely for synchronisation on radio communication which, in the face of more difficult terrain, greater operating distances, and consequently noisier atmospheric conditions, are finding increasing difficulty in meeting the timing standards demanded.

As will appear from the description, the invention provides means whereby a seismic source can be triggered at a location almost any distance from the recording instrument, and permits the times of the disturbance and its reception to be recorded with high accuracy, which is as good as or better than the present required timing standard of 1mS.

As is well known in the art the seismic signals ("shots") which are transmitted can be generated in a number of ways. These include not only the firing of explosive charges of various kinds but also the generation of seismic waves in the earth by electrical, mechanical and other means, including hydraulic. In some of these methods, including ones known under the Registered Trade Mark "Vibroseis", the object is not to transmit a short pulse or shock wave, similar to those produced by the detonation of explosive charges, but to generate seismic waves having a particular wave-form and of appreciable length. The apparatus which will be described can be used just as well and in the same way for triggering off the apparatus which transmits such seismic signals as for firing explosive charges or their equivalents (sometimes referred to as "blasters").

Among the sources of seismic signals which are at present known mention may be made of the following:

| Energy derivation | | General or Proprietary Name |
|---|---|---|
| Dynamite: | | Aquaseis |
| | | Flexotir |
| Air: | | Air Gun |
| | | Seismojet |
| | | Hydro-Sein |
| Gas: | Propane-oxygen | Aquapulse |
| | " | Seisprobe |
| | " | Dinoseis |
| | Oxy-acetylene | GASSP |
| | Carbon dioxide | Cardox |
| | Diesel gas | DUSS |
| Electrical: | | Sparkarray |
| | | WASSP |
| | | Boomer |
| | | Pinger (various) |
| | | Vibroseis |
| Hydraulic: | | Vibroseis |

Considering a seismic survey in which seismic signals from a single source ("shot point") are received and recorded at a receiving or control station, two timing units, which may be identical with each other, are used, one at the receiving station and the other at the remote source location. Each unit contains an identical high stability temperature-controlled crystal oscillator whose frequency is divided down to produce an output at constant intervals, in the present case once every ten seconds. At the recorder this output places a time reference on the recorded data, while at the remote location the output triggers the seismic source instantaneously, or at least with only a very small and known delay.

Before surveying is started, for example at the start of a day, the two timing units are brought together, which may be done by bringing the unit from the or each source location to the receiving station, and are accurately synchronised with each other. This is done by physical interconnection between the units and an accuracy of the order of ± 1mS standard is maintained nearly 14 hours after the initial synchronisation. During this time either of the units can be taken to any remote location to trigger a seismic source, while maintaining an acceptable standard of synchronisation.

When a signal is to be transmitted, this is done by the timing unit at the shot point whilst, at the same instant, the corresponding time pulse is recorded at the receiving station from the timing unit there; this provides an accurate basis for the measurement of the travel times of the signals which are received and recorded after their transmission and reflection in the earth's crust.

The invention, particularly as applied to seismic surveying, will now be described, by way of example, with reference to the accompanying drawings:

FIG. 4 gives typical phase registering waveforms and shows the effect on the output pulse widths of master and slave inputs in different states of coincidence;

FIGS. 5 and 6 are block diagrams showing the invention used in a "Vibroseis" system, FIG. 5 showing one STS unit at a shot (vibrator) point and FIG. 6 showing a similar unit at a receiving (recording) station.

FIG. 7 shows diagrammatically the circuit of a vertical time counter which may be used with the apparatus of the invention.

Figure 1:
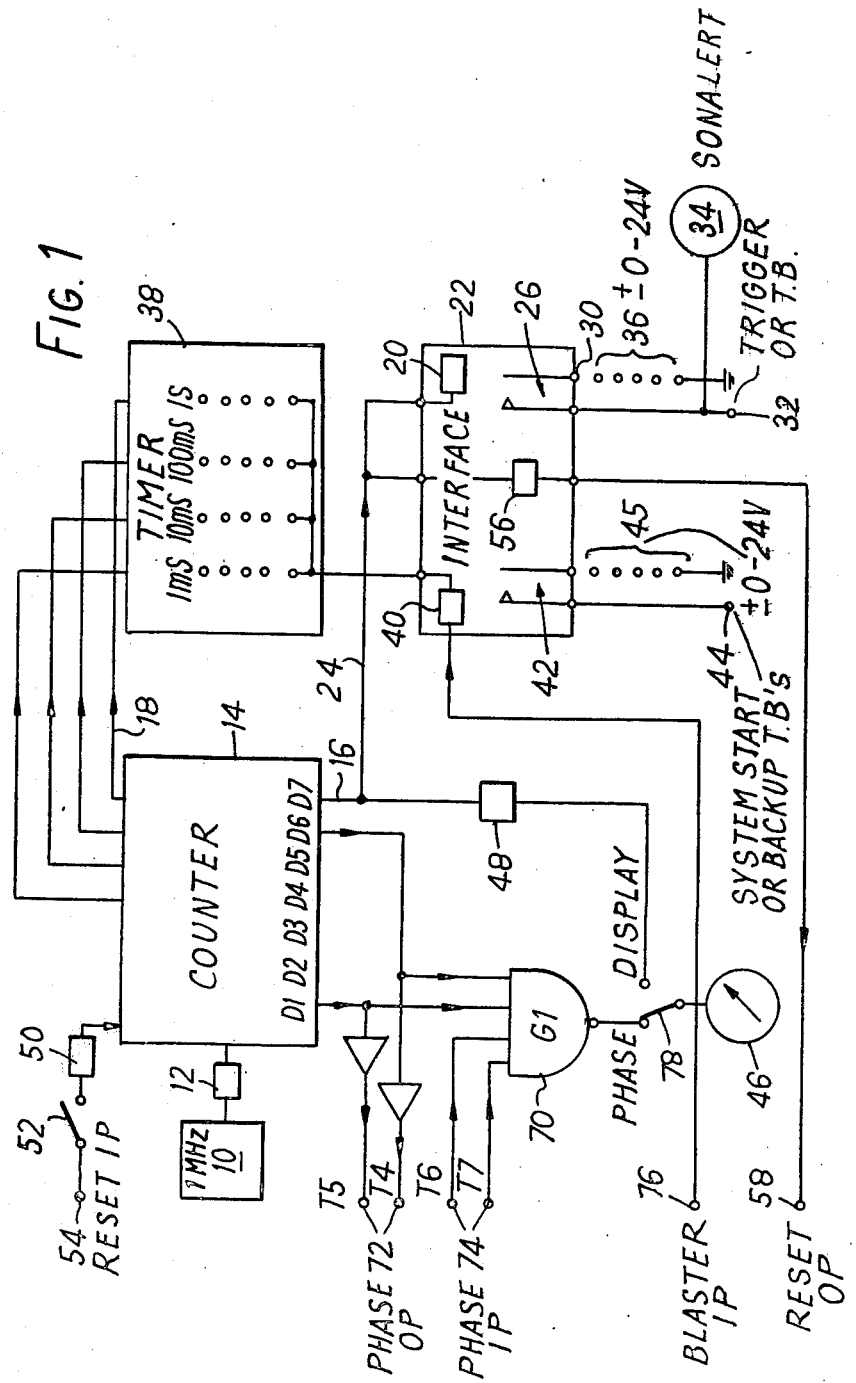
FIG. 1 is a simplified block diagram of a single timing unit (also referred to as an STS unit)

Referring first to FIG. 1, the unit shown, which may be used as a master unit at the control point or as a slave unit at a shot point, comprises a high stability 1 MHz quartz crystal oscillator 10 the output of which is fed to and shaped by a Schmitt trigger 12. The crystal is kept at a constant temperature, such as 75°C.

The 1 MHz output of the trigger 12 is then divided down through seven stages D1 to D7 of a decade counter 14 to give a pulse once every 10 seconds at the outputs 16 and 18 of the counter 14. This pulse is used to initiate a drive current of programmable duration in a monostable multivibrator 20 in an interface unit 22 to which it is fed through line 24. The output of the monostable 20 operates a relay 26 the contacts of which are connected through terminals 28 and 30 to a trigger terminal 32 and a warning device 34 and to earth, through a voltage source 36.

Figure 3:
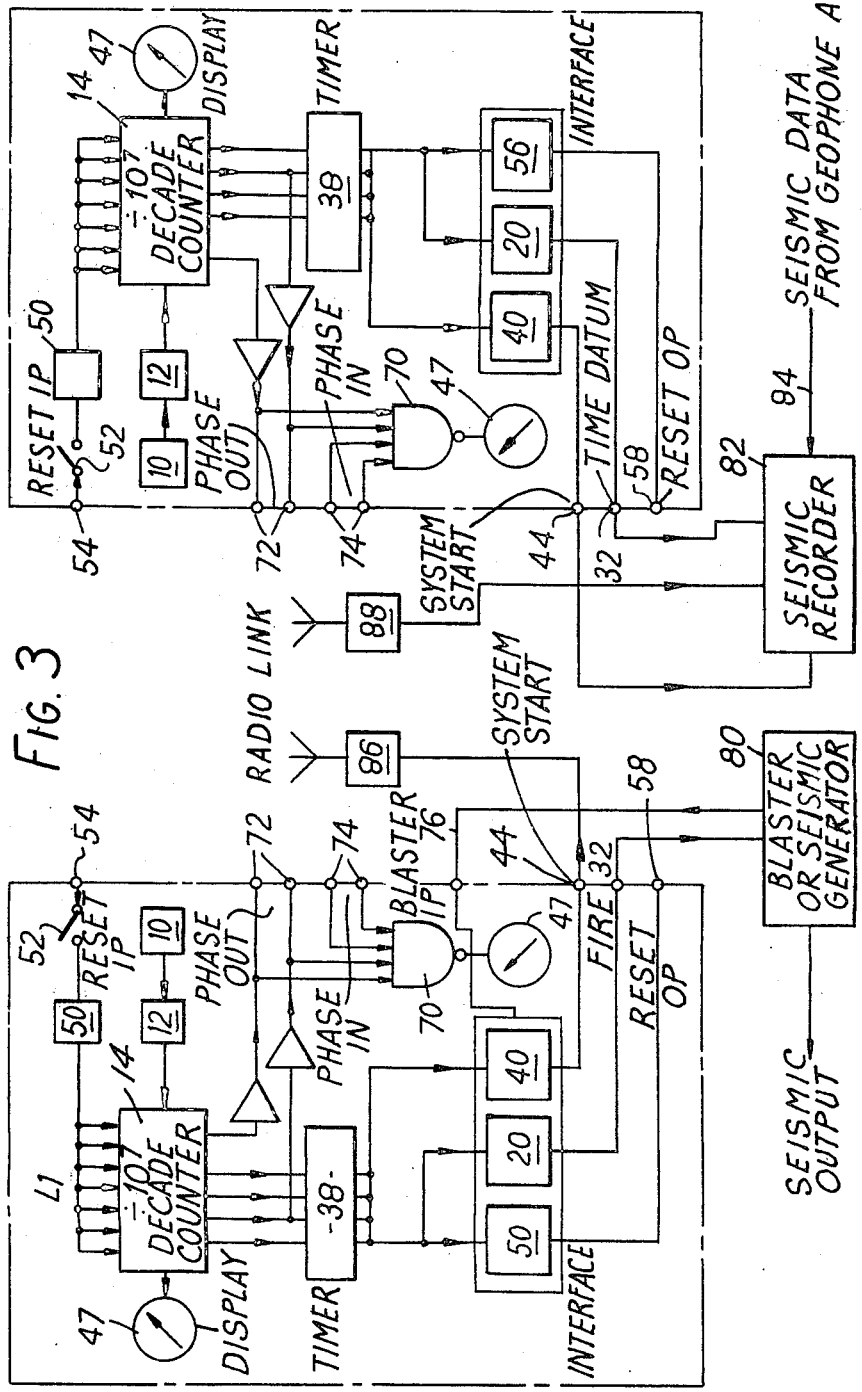
FIG. 3 is a simplified block diagram showing the external cable connections used when the system is interfaced for normal field operations.

When the unit of FIG. 1 is used as a slave unit at a source location and the contacts 26 are interfaced with a triggering device, as will be described with reference to FIG. 3, their closure is used to trigger the seismic signal. On the other hand, when the unit is used as the master at the receiving station, the closing of the contacts of relay 26 is used to put a time datum on the recorded data in the seismic recorder, which is shown in FIG. 3.

Each slave unit is provided with its own power supply (not shown) which may be included in the unit itself. Similarly the master unit has its power supply, which may be similar to that of the slave units. In a preferred construction the slave and master units each include a rechargeable Cd/Ni battery which can be connected to a suitable power source to recharge the battery.

To start the recorder somewhat ahead of the seismic disturbance, so that the recorder at the control point will be operating before the signal is received, the last four decade counter outputs (from D4, 5, 6 and 7) are decoded by appropriate cross connections in the decoder 38 so that an output pulse can be made to occur at any time in steps of 1mS, relative to one of the ten second pulses. This "system start" pulse initiates a drive current of programmable duration in a monostable multivibrator 40 operating a relay 42 the contacts of which are interfaced, through terminal 44 and power source 45, so as to start the recording apparatus.

The duration of the operating currents for relays 26 and 42 are programmed by controlling the timing of the monostable circuits 40 and 20 by selecting appropriate external components.

To provide a visible indication of the counting state of the decade counters, for the purpose of warning the operator of the approach of a trigger or time reference pulse, the B.C.D. outputs from the final decade counter D7 are connected to a sensitive meter 46 by weighting resistors in a current summing digital to analogue configuration resistor bank 48. The values of the resistors in this bank are so chosen that the position of the meter needle gives an indication of the number of seconds to the next trigger or time reference pulse.

In order to allow the slave units to be synchronised with the master unit, for the purpose of making triggering produced by each slave unit coincide with the time reference pulse from the master unit which is recorded, each of the units includes a Schmitt trigger 50 which is connected between the decade counter 14 and (through a push-button switch 52) to a reset input terminal 54. A monostable 56 is also provided which is connected between the D7 output of decade counter 14 (via line 24) and a reset output terminal 58.

Figure 2:
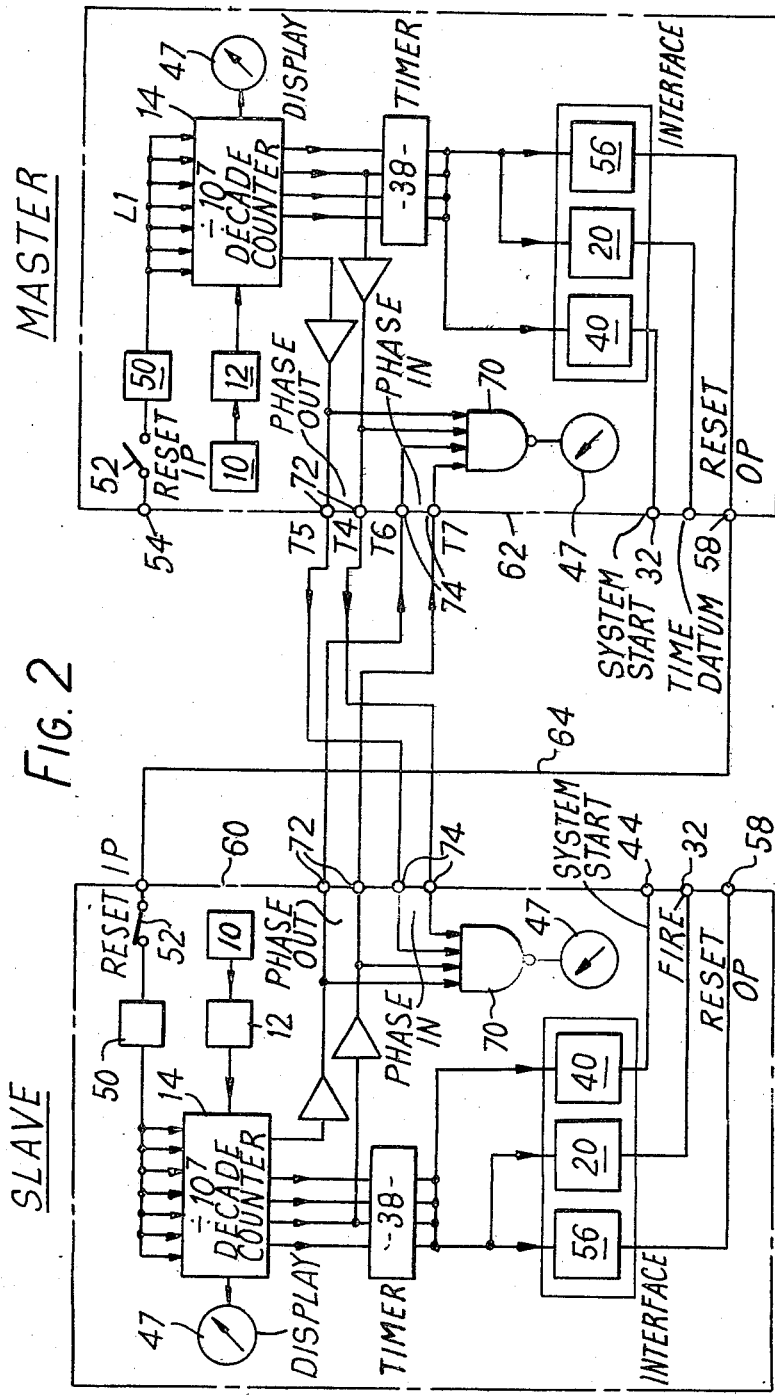
FIG. 2 is a simplified block diagram showing two similar STS units with cable connections necessary for synchronising one unit (the slave unit) to the other or master unit; phase connections are also shown which are for the purpose of comparing the crystal oscillator frequencies for checking or retuning.

When master and slave units are connected as shown in FIG. 2, for the purpose of synchronisation, closure of the switch 52 in the slave unit 60 will cause the master unit 62, acting through line 64, to reset all counters in the decade counter 14 in the slave unit.

The pulse necessary to reset the counter of the slave unit is generated by the master unit in monostable 56 from the same transition which initiates the time reference pulse monostable 20. The timing components selected for the monostable 56 circuit are such as to produce a 300µS synchronising pulse.

The synchronisation process, which will be more fully described, can be repeated so that any number of slave units can be synchronised to a particular master unit. The accuracy of synchronisation depends upon the crystal frequency and the relative phase of the two oscillator outputs: for a 1MHz oscillator it is of the order of 1μS.

With two units synchronised a facility, which will be described, is provided whereby the frequencies of the oscillators can be compared for check purposes or for returning adjustments when necessary. The method is intended for use in the field where no external measuring instruments are available and will, nevertheless, give an accuracy in this particular system down to a few parts in $10^{10}$. The measurement is made by comparing two specially generated synchronising waveforms in a phase comparator.

The waveforms required for synchronisation are generated by AND-ing an output from the decade counter D1 with one from D6 (FIG. 1). The result, in this example, is a square wave of frequency 200KHz, of duty cycle 40% and of duration 200mS every second. Such waveforms are shown in FIG. 4, where A and B are the input waveforms of master and slave units, respectively, in each case before synchronisation; C is the waveform of the output of the gate 70 before synchronisation; D, E and F are and respectively the master and slave inputs and the output of the gate 70 at a time when the waveforms are approaching non-coincidence.

The cross-connections from D4, D5, D6 and D7 in each unit are such that an output pulse can be made to occur at any time, in steps of 1mS, relative to one of the 10 second pulses of D7. This "system Start" pulse initiates a drive current of programmable duration in the monostable 40 to operate the relay 42 whose contacts are interfaced so as to start the recording equipment.

For synchronisation, the two waveforms A and B, one from the master unit and one from the slave unit, are brought together in the gate 70. The output of the gate shows the degree of coincidence of the two waveforms, the width of the pulses in the output waveform being the overlay of the positive excursion of one waveform on that of the other; i.e. when the waveforms are exactly coincident the positive excursions of the output waveform are 2μS in duration; when non-coincident the positive excursions vanish.

The gate 70 is connected via an inverting buffer and a simple diode rectifier (not shown) and switch 78 to the display meter 46. The D.C. level measured by the meter is, therefore, related approximately linearly to the pulse width of the output waveform, i.e. to the degree of coincidence of the wavetrains from the master and slave units. It also appears precisely once per second so the display, following a fresh synchronisation of two STS units 60 and 62, is seen as a series of one second kicks of the meter needle to a deflection which changes slowly as the synchronisation of the two crystal oscillators drifts apart. The deflection may be an increasing or decreasing one, depending on the relative phase of the oscillators; it will be zero when the master and slave waveforms are non-coincident, a maximum at perfect coincidence and zero again at the next position of non-coincidence.

Since the positive excursions of the waveforms are of 2μS duration and the spaces 3μS the observation of a complete cycle of deflections from zero through maximum and back to zero indicates a drift of 4μS and the period between one cycle and the next when the deflection is zero, a drift of 1μS. Since the meter needle kicks once every second, the time taken for one such cycle can conveniently be timed by counting the deflections from when they just begin to appear at the start of a cycle, increase through maximum and decrease again to zero. The number of kicks is the number of seconds which elapse for synchronisation to drift 4μS, so that from the count the difference between the oscillator frequencies of master and slave units can be calculated.

The result gives a quick check on the readiness of the system for day to day field operation and also provides a warning that, in the event of a count below a prescribed minimum, returning of the oscillators should be carried out.

Returning to an extremely simple operation, while observing the drifting meter needle deflection the slave oscillator frequency is adjusted in such a direction as to arrest the change in the deflection. Doing so arrests the time drift of one waveform with respect to the other, so decreasing the frequency difference between the oscillators.

FIG. 3 shows a recording station and a remote unit with external connections typical of those used in the field. In this case the two units have already been synchronised so that the reset inputs and outputs are left unconnected. System start is used in the recording unit to start recording before the time datum arrives.

System start can be used in the remote unit, on the other hand, to relay to the recording station a series of check pulses related to the initiation of the source generator.

As shown in FIG. 3, when surveying is to take place, after synchronisation the slave unit, or each of a number of them, is taken to the remote shot point or points where its trigger terminal 32 is connected to the blaster or other seismic signal generator or control 80 which is to be used. The system start and time datum terminals 44 and 32 of the other unit are connected to the seismic recorder 82, which is also supplied at 84 with seismic data from the geophone array which is used.

The switches 78 are set to connect the meter 46 to the meter bank 48 and hence to the D7 output of the counter 14. (In FIGS. 2 and 3 two meters 47 replace meter 46 and switch 78).

Although a radio link is shown at 86 – 88, which will be described later, the only connections between the master station and firing points which are necessary are those required to keep the operators in touch with each other, so that the operators at the shot points can communicate with and receive instructions from the master station, with a warning of less than 10 seconds before a shot is to be fired. Radio or line connections can be used and it does not matter if the conditions are bad, providing that messages can be passed.

When a seismic signal is ready to be triggered at a shot point and the operator at the master station has been advised that the shot point is ready he starts the recording equipment at the master station and warns the operator at the shot point. The latter closes a firing switch (not shown) so that the signal will be triggered by the next pulse from the trigger 20 of the slave unit at the shot point. At the master station the corresponding pulse from the trigger 20 of the master unit, which will be accurately synchronised in time with the pulse which triggers the shot, will be recorded on the record to provide a datum. It will thus be seen that by using separate oscillators, which have been synchronised at the beginning of the day at a time when the slave units could be connected directly to the master unit, an accurate synchronisation between the triggering of the seismic signal or shot and the recording of the datum can be obtained, without unknown errors which could result from difficult radio conditions.

Notwithstanding that the most valuable feature of the link system is its total independence upon a communication link for effecting the synchronisation (although some intelligeable communication between the operators will be needed), in operations when and where an adequate link does exist an option is provided for the transmission from the source location to a remote recording station of data giving timing checks on both the trigger instant and also the residual accuracy of the synchronisation between the two units. This timing check takes the form of a programmable sequence of pulses which are transmitted and received through the line 86–88, the first pulse occurring at the trigger instant and the remainder related to associated timing events in the source point unt. The intervals between pulses, and the pulse durations themselves, can be selected to suit the prevailing noise level in the communication link. Typical intervals are 100mS, 200mS and 1 second and durations anything from 2mS to 50mS. The more frequent repetition would be used where the noise level was high, so that even if the majority of the pulses received at the recorder were mutilated, nevertheless, the remainder of the pulses would indicate the true shot instant. The less frequent repetition rate would be possible in quiet radio conditions.

Provision can also be made to transmit a vertical time datum over the same link by superimposing it upon the pulse train. Adequate identity of each datum, both the timing check and the vertical time, is preserved even though these are transmitted on the same data channel. The vertical time pulse is, however, not connected in any way with the functioning of the STS system, apart from time-sharing the communication link as described.

Referring to FIGS. 1 and 3, the initiation of check pulses (so called back-up time breaks) is caused by the pulse emitted by the blaster 80 as the shot fires. Thus, the output of monostable 22 triggers the blaster or seismic source. At this instant a return pulse is sent back into the unit at 76. This pulse sets the monostable 40, allowing a programmed sequence of pulses generated in the Timer to appear at System Start output 76. From this point the pulse train is interfaced to be transmitted back to the recording station over the radio link.

In FIG. 3 the reference 80 indicates a blaster or seismic source which may be of any of the kinds which have been referred to above. FIG. 5, however shows particularly the connecting of a slave unit at a receiving and recording station to "Vibroseis" type equipment at that station, with the inclusion of an interface stage. A similar interface stage is also shown in FIG. 6 between the STS unit and the signal generator at the shot point, although the need for this can be avoided, as will be described.

In either case the interface stage is a device for converting the STS pulse into the most suitable form to initiate the seismic output. With the "Vibroseis" system, where the source energy is constrained to conform to a precise amplitude/frequency/time relationship, the interface stage consists of a sweep frequency generator which is initiated by the STS time pulse. Similar generators could be used in the recording truck and in the vibrator trucks, that is in the signal generating and in the receiving equipment. It is preferable to use a digital sweep generator for this purpose since this can be programmed very precisely and has an equally precisely repeatable output. Being a costly item, however, the fewer which have to be used in a seismic exploration the less the cost. Using the STS system of the invention only one digital sweep generator and two STS units are necessary, in conjunction with the standard Vibroseis recording equipment and the vibrator electronics; that is, no special radio data transmission system is necessary, apart from simple radio communication. No modulators or demodulators are needed and therefore no inherent associated phase shifts result.

Referring to FIG. 5, this shows an STS unit 90 the fire output 92 of which is shown at 32 in FIGS. 1 and 3. This is connected to an interface stage in the form of a digital sweep generator 94. The analogue output of this is fed to Vibroseis transmission equipment, which is shown as comprising three vibrator electronic units 96 each controlling a vibrator 98.

At the receiving and recording station (FIG. 6) a similar STS unit 100 has its output 102 (corresponding to 32) connected to and controlling a sweep channel unit 104, the output of which is recorded on tape by the recorder 106 (shown at 82 in FIGS. 1 and 3). This recorder also records system start signals fed to it from the unit 100 through a line 108.

FIG. 6 shows an interface unit 110 in the form of a digital sweep generator similar to the generator 94 of FIG. 5, but the use of such an interface stage is not essential at the receiving station. The need for it could be avoided by, for example, using a pre-recorded tape having a recording identical to the generator programme.

At the transmission point a single generator could be fitted in the central one of the vibrators 96 (FIG. 5) of the group and the signal from this could be fed by cables to the other vibrators at that transmission point. This could be done using reel-in automatically-tensioned cables between the trucks carrying the different vibrators. This would result in a simplification and reduction in cost of the equipment and increase the efficiency of operation in the field.

An additional facility can be provided for the STS system to avoid the necessity of transmitting back a vertical time datum to the recorder as described above, which method uses a communications link and is not therefore any function of the STS system except in that it provides an added help in controlling the time sharing multiplexing described.

The vertical time datum is used in seismic operations in the computation of corrected travel times to the detector array connected to the recording instruments. For this purpose the information required is the time interval in milliseconds between the triggering of the source and the arrival at the surface vertically above the source of the resulting seismic disturbance.

The proposed facility measures this time interval in the STS unit at the remote source location. A number of different ways of doing this are possible, but the method which will now be described is preferred because it uses little power and furthermore uses with small additions a piece of circuitry identical to that used elsewhere in the system.

Referring to FIG. 7, the blaster or shot triggering unit, here shown at 102, is connected to the seismic wave generator 104 at the bottom of the shot hole 106.

At the shot instant a pulse is generated in the blaster 102 and is shaped in a Schmitt trigger 108 to set a flip-flop 110. It is also fed to two decade counters 112 and 114. Setting the flip-flop 110 presents a logical "1" at the input of a NAND gate 116, allowing the basic count frequency of 1KHz derived from the main counter 10 of FIG. 1 to be extended to the counters 112 and 114. Counting continues until the vertical time datum is received by a geophone 118 at the top of the hole 106. The resulting pulse is amplified in a differential amplifier 120 and shaped in a Schmitt trigger 122, whence it resets the flip-flop 110. A logical "0" is now presented to the NAND gate 116 and the 1KHz frequency is disconnected from the decade counters 112 and 114. The count consequently stops and is read off on a meter display 124.

The arrangement for effecting double action conversion (units 126 or tens 128) is identical to that described for the main counter of FIG. 1. being a current summing configuration having resistors of values inversely proportional to the digit represented by the associated BCD output. For adequate accuracy (1mS) within the desired 1 – 99 mS range two displays representing tens and units are provided, connected by a switch 130.

Cancellation of the display occurs at each trigger instant.

I claim:

1. Apparatus for obtaining accurate time synchronisation at remote points without direct communication of the time between these points utilising separate timing units which can be used at separate points and which can be brought together at one point for synchronisation, wherein each of said units comprises a constant frequency oscillator for producing a time wave, a frequency divider in each unit comprising a counter having multiple stages for producing from the time wave in each respective unit time pulses at intervals of time which are the same in different units, and means for synchronising the time pulses of one unit with those of the other unit when the two units are brought together and connected to each other, said synchronising means including means in each unit for combining the outputs of a number of the stages of the counter of that unit, means for comparing the phases of the resulting time pulses of the two units when they are connected together and means for providing a visual indication of the relative phases of the time pulses of the two units, each unit including means for providing pulses after the units have been synchronised and while the units are at remote points and operating independently of each other to cause the units to produce signals which are accurately related in time with each other.

2. Apparatus for obtaining accurate time synchronisation at remote points without direct communication of the time between these points utilising separate timing units which can be used at separate points and which can be brought together at one point for synchronisation, wherein each of said units comprises a constant frequency oscillator for producing a time wave, a frequency divider in each unit comprising a counter having multiple stages for producing from the time wave in each respective unit time pulses at intervals of time which are the same in different units, and means for synchronising the time pulses of one unit with those of the other unit when the two units are brought together and connected to each other, said synchronising means including means in each unit for combining the outputs of a number of the stages of the counter of that unit and means for comparing the phase of the resulting time pulses of the two units when they are connected together, each unit including means for providing pulses after the units have been synchronised and while the units are at remote points and operating independently of each other to cause the units to produce signals which are accurately related in time with each other, at least one of the units including means for producing a shot firing or triggering signal and another of the units having apparatus connected thereto for recording both received seismic data and timing pulses produced in that unit, wherein the units are similar to each other, and wherein said counter comprises a decade counter for producing from said oscillator a plurality of said time pulses at uniformly spaced intervals, and wherein said combining means further includes means for producing wave forms from said decade counter time pulses, the relative phases of said wave forms, when the units are connected together, being an indication of the synchronisation of one unit with the other, and means for resetting the decade counters simultaneously when the units are connected together for synchronisation.

* * * * *